United States Patent [19]

Moltrasio

[11] Patent Number: 5,002,458
[45] Date of Patent: Mar. 26, 1991

[54] CONTINUOUSLY OPERATING SYSTEM FOR MUTUALLY AUTOMATICALLY LOCATING, ACCORDING TO ANY DESIRED PATTERNS, BAGS, BOXES OR OTHER ARTICLES, PARTICULARLY FOR USE IN MACHINES FOR LOADING MOVABLE PLATFORMS

[75] Inventor: Mario Moltrasio, Bergamo, Italy

[73] Assignee: Car-Ventomatic S.p.A., Bergamo, Italy

[21] Appl. No.: 387,657

[22] Filed: Jul. 31, 1989

Related U.S. Application Data

[63] Continuation of Ser. No. 112,812, Oct. 23, 1987, abandoned.

[30] Foreign Application Priority Data

Nov. 3, 1986 [IT] Italy .................................. 2931 A/86

[51] Int. Cl.$^5$ .............................................. B65G 57/06
[52] U.S. Cl. .................................. 414/792.1; 198/631; 414/788.9
[58] Field of Search ................ 198/374, 574, 586, 631; 414/791.6, 791.8, 792, 788.9, 793.4, 792.1

[56] References Cited

U.S. PATENT DOCUMENTS 3,921,825 11/1975 Sheehan ......................... 414/792 X

FOREIGN PATENT DOCUMENTS 2924827 1/1981 Fed. Rep. of Germany .

Primary Examiner—Robert J. Spar
Assistant Examiner—Janice Krizek

[57] ABSTRACT

This system for mutually automatically arranging, according to any desired patterns, bags, boxes or other articles, particularly for use in machines for loading movable platforms (pallets) is characterized by a locating conveyor belt mounted on a carriage so as to also transversely slide, in a preset way, on supporting guides to drive the articles conveyed thereby with a possible motion deriving from the combination of two simultaneous perpendicular motions in order to locate each article, which may be preoriented, in a suitable position to make, in cooperation with other articles, the preset platform filling pattern so as to provide a comparatively compact layered assembly.

8 Claims, 2 Drawing Sheets

CONTINUOUSLY OPERATING SYSTEM FOR MUTUALLY AUTOMATICALLY LOCATING, ACCORDING TO ANY DESIRED PATTERNS, BAGS, BOXES OR OTHER ARTICLES, PARTICULARLY FOR USE IN MACHINES FOR LOADING MOVABLE PLATFORMS

This is a continuation of co-pending application Ser. No. 112,812 filed Oct. 23, 1987, now abandoned.

BACKGROUND OF THE INVENTION

The present invention relates to the field of automatic devices for guiding articles to be arranged according to desired or preferable patterns in order to locate them, if necessary with a layered configuration, on platforms or pallets for handling forks or other conveying systems.

As is known the industries making goods in large amounts have storing requirements demanding a precise and ordered arrangement of said goods according to patterns which are deemed to be preferential. This is particularly true as said goods are to be arranged in a layered configuration on pallets provided for handling said goods or articles to store or shipping them.

To that end, the above mentioned industries presently use the so-called palletizing machines which are specifically designed for loading pallets. These machines essentially comprise conveyor belts which, according to the most suitable paths, deliver the article (bag, package) to a switching platform whereat it is oriented and sent to any desired place in order to rationally arrange it on the pallet, or over other like articles of an underlying layer which have already been arranged on the pallet.

The articles to be arranged have frequently a parallelepipedal shape and, accordingly, they are to be generally mutually oriented in order to achieve the following results: to occupy a very reduced space; to provide a very strong layered structure; to mutually arrange the articles in such a way as to reduce as much as possible the specific pressure exerted on their surface by the weight on the overlying layers.

FIG. 1 illustrates the surface of a pallet having a square perimeter Z and covered by four rectangular elements a,b,c,d (which may consist of cement bags) arranged according to a perimetrical pattern. FIG. 2 illustrates a subsequent layer formed by other four rectangular elements e, f, g, h (like the preceding elements) which are arranged over the elements a, b, c, d. The different arrangement of the articles of FIGS. 1 and 2 shows that the friction exerted by the weight of the overlying articles allows for the latter to act as a "junction" for the underlying articles, thereby providing the assembly with great stability properties.

FIG. 3 illustrates the surface of a pallet having a rectangular perimeter U, and covered by five rectangular elements i, l, m, n, o which are arranged in an adjoining relationship.

FIG. 4 illustrates a subsequent layer formed by other five articles or elements (like the preceding ones) p, q, r, s, t which are accordingly arranged so as to provide a mirror arrangement of the above disclosed arrangement, to meet the requirements of a maximum use of the pallet surface and maximum strength of the layered assembly.

It should be pointed out that FIGS. 1, 2, 3 and 4 merely show examples of conventional arrangements to clearly stress the requirement of arranging the articles to be palletized at very precise locations. This precision requirement will be more and more stringent as the articles to be palletized are held in delicate or lacerable envelopes and as their weight is comparatively great; an example of these articles is that of cement bags which, as is known, are usually made of paper. In FIGS. 1, 2, 3, 4 there are identified the positions assumed by the elements, having their geometrical center of gravity marked by a dot x. Thus the trajectories y to be followed by the centers of gravity of these articles during their rectilinear longitudinal motion, toward the stop and aligning abutment W, and imparted thereto by specific driving means will be clearly apparent.

Considering that the articles to be arranged arrive at the switching platform from a single trajectory that is determined by a feeding conveyor belt, the problem to be solved is to cyclically transversely offset the mutually different parallel trajectories y to arrange the several articles in the positions shown in the figures according to cyclic sequences of the type abcd, efgh, abcd, efgh (FIGS. 1 and 2); or of the type ilmno, pqrst, ilmno, pqrst, ilmno, etc.

Another way for solving the above problem is to cause the articles to slide on a roller assembly having, between the rollers, raisable and transversely movable rods to raise the article (to move it away from the driving rollers), transversely displace it so as to arrange it on the desired longitudinal trajectory (y), and arrange it again on the roller assembly to reach a stop barrier with the desired orientation and trajectory, in order to obtain the preset layered configuration.

As is known the layered structure or configuration may be formed in several ways. One of them is to pick up the complete layer by means of carriages having suction cups and arrange it on the preceding layer; another of them is to form the layer on shelves which are downwardly displaced to deposit the layer and then upwardly displaced to remove them from the layer (which is suitably held by the vertical wall touched during the downward displacement); another way is to cause the article layer or another preformed layer to fall on the pallet by opening a trapdoor made by transversely displacing two half panels (thereon it was caused to rest), by holding the layer by means of suitable side abutments.

An arranging method is also known consisting of transversely displacing a pallet; however this method has the drawback that the pallet return stroke cannot be used.

In connection with the known method of raising the articles by means of rods arranged between the driving rollers and transversely sliding, it has the drawback that it is necessary to interrupt the feeding of the article.

SUMMARY OF THE INVENTION

The object of the present invention is to provide a device for automatically mutually arranging, according to any desired patterns, bags, boxes or other articles without causing said articles to graze or impact against the conveyor belt.

Another object is to provide an arranging device which is able of continuously operating, by using the return strokes.

Another object is to provide an arranging device of the above mentioned type which affords the possibility of increasing, the operation time being the same, the amount of the arranged articles by exploiting the shortest operating trajectory.

These and other objects will become more apparent to those skilled in the art by the following disclosure and appended claims.

A system for automatically mutually arranging, according to any desired patterns, bags, boxes or other articles, particularly for use in machines for loading movable pallets, characterized by a locating conveyor belt mounted on a carriage so as to transversely slide in a preset way on supporting guides to obliquely displace the articles supported thereon with an oblique motion deriving from the combination of two simultaneous perpendicular motions so as to arrange each article, possibly in a previous oriented attitude, in the position to provide, with other articles, the pallet filling preset pattern, to obtain a very compact layered structure.

BRIEF DESCRIPTION OF THE DRAWINGS

The several aspects of the invention are illustrated, by way of an indicative but not limitative example, in the accompanying figures where.

DESCRIPTION OF THE PREFERRED EMBODIMENTS

Figure 5:
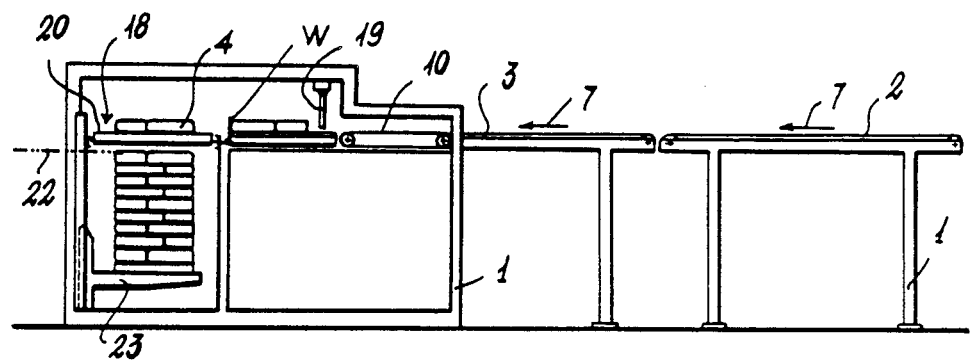
FIG. 5 is a side schematic view of a palletizing machine.
Figure 6:
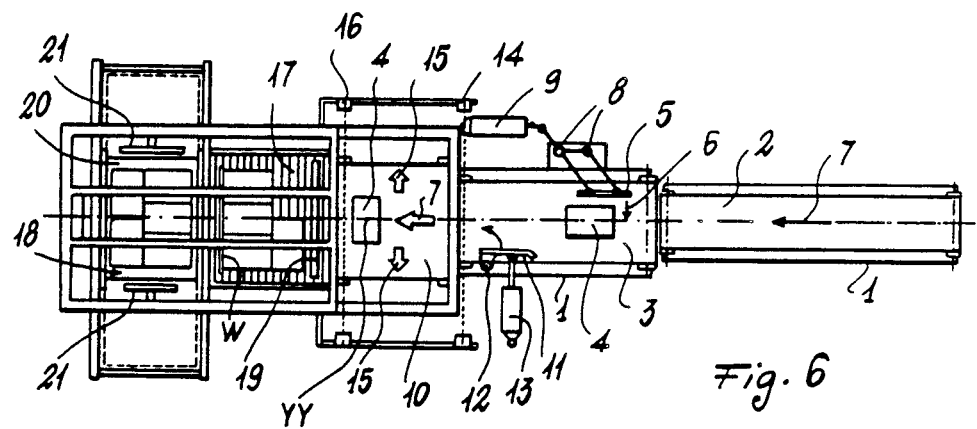
FIG. 6 is a schematic top view of the same palletizing machine.

With reference to the above mentioned figures 5 and 6, the machine comprises a columnar structure 1 provided for also supporting several starting conveyor belts 2, supplying a pre-locating belt 3 made of an antifriction material and thereon the articles 4 are rotated through 90° in order to hold them in a precise common trajectory, which generally consists of the center trajectory yy.

To that end, the articles 4 are transversely displaced with respect to their preset feeding trajectory yy with a displacement which is equal and opposite to the displacement of their centers of gravity during the subsequent 90° orienting step by means of a pallet 11.

This starting transversal displacement 6 is obtained by means of a pallet 5 included in an articulated parallelogram driven by a piston 9 through a linkage articulated at 8, in order to reduce grazing between article and pallet.

The tilting through 90° is carried out by the pallet 11 which is driven by a piston 13 and articulated at 12.

After this prelocating, the article 4 is sensed by an inlet sensor 14.

As the article, because of its continuous motion, moves away from the operating range of the inlet sensor 14, i.e. it is arranged completely above the locating conveyor belt 10, said conveyor belt is electrically enabled to start the transverse displacement in the suitable direction 15, under the control of its sequential operating program: during this step, the conveyor belt will be continuously longitudinally driven in the direction 7.

In connection with the operation of the sensor 14, the subsequent transverse displacement of the conveyor belt 10 will be carried out only as the article 4 has completely moved away from said belt 10, as sensed by an outlet sensor 16.

The sensors 14 and 16 may also stop the feeding of the belt 10, if required by particular operating programs.

Figure 1:
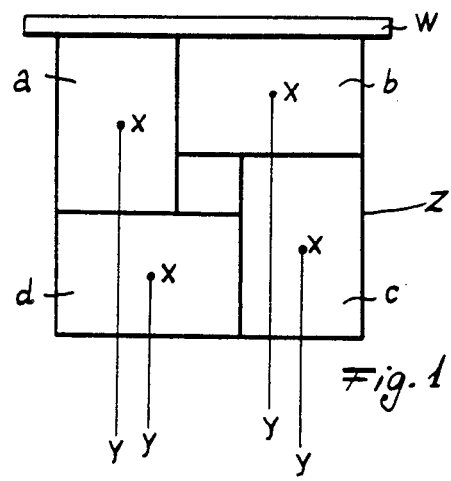
FIG. 1, which has been already described, shows a possible layer formed by four like rectangular articles.
Figure 2:
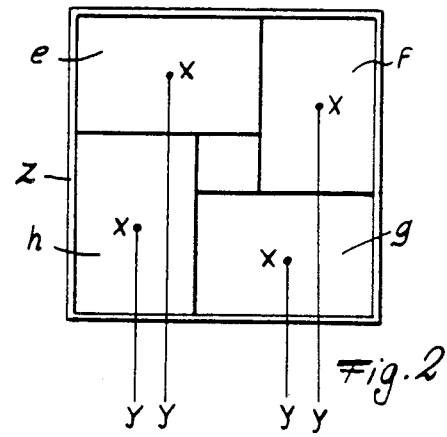
FIG. 2, which has been already described, shows another possible layer formed by four like rectangular articles to be superimposed on the layer of FIG. 1 in order to provide a very strong layer stack.
Figure 3:
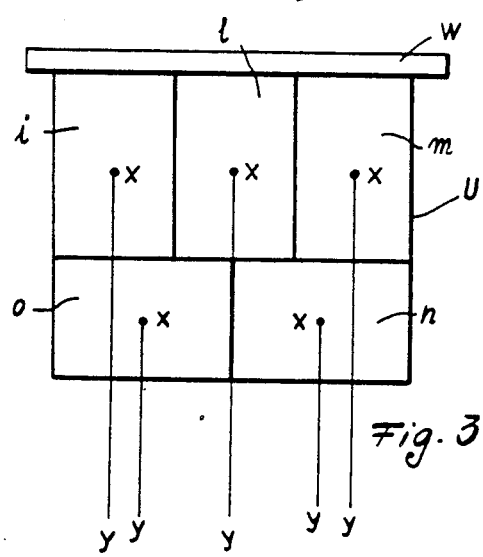
FIG. 3, which has been already described, shows another layer made by five like rectangular articles.
Figure 4:
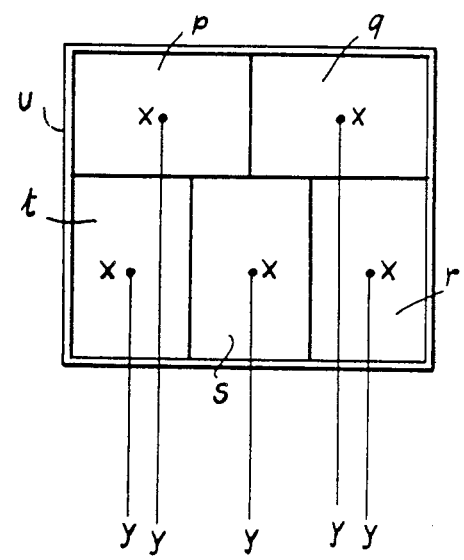
FIG. 4, which has been already described, shows another layer formed by five like rectangular articles to be superimposed on the layer of FIG. 3 in order to form a very strong layer stack.
Figure 7:
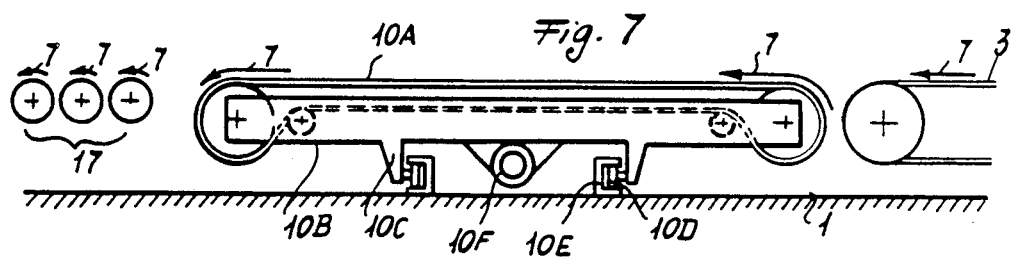
FIG. 7 is a side view illustrating a detail of FIG. 5 comprising the main feature of the present invention and consisting of a locating conveyor belt.

Upon exiting the conveyor belt 10, the article 4 will be arranged on a roller assembly 17 (consisting of a plurality of parallel flat arranged driving supporting rollers) and transported to a stop abutment W. Thereat the article, having the previous oriented attitude, is caused to occupy its preset position in order to obtain the desired layer configuration. In the drawing there is illustrated a configuration like that shown in FIG. 3. This configuration, as the greater part of the used configurations, is obtained by causing a first article row (i, l, m) to abut against the barrier or abutment W and causing a second article row (n, o) to abut against the previous formed article row. In order to prevent the first article row supporting rollers from unneccessarily continuously rotating during the making of the second article row (n, o), said rollers are stopped by means of the operation of conventional sensors, or by an operation related to the layer forming sequence. This possibility of operating the roller assembly "by sectors" may obviously also be applied to layers including several rows.

After having completed the layer, the abutment W is tilted through 90° so as to arrange it horizontally and provide a connection bridge between the roller assembly 17 and platform 18.

After this step, or simultaneously therewith, a preset stroke pallet 19 will displace the layer toward the platform 18 so as to precisely arrange it over a trapdoor 20 thereof.

At this time another two transverse pallets operate, indicated at 21, and provided for transversely holding in a stationary condition the layer to allow for the two trapdoor forming panels to transversely slide by grazing under the previously supported articles.

In this way, the layer will be downwardly displaced, and will be located on the level plane 22 which is formed either by the pallet resting surface or by the top surface of the previously fallen layer. The height wherefrom the layer is caused to fall is reduced to minimum values by the automatic locating, at several levels, provided by the platform 23 which is lowered by the height of a layer before receiving the subsequent layer. After having constituted on the pallet the desired number of layers, the pallet will be removed from the platform 23, thereby leaving it in a free condition, to receive another empty pallet to be reloaded, and resume the loading cycle.

With reference to the locating conveyor belt 10, a preferred non-limitative embodiment thereof is detailed thereinbelow.

It consists of a conventional conveyor belt 10A having its roller supporting frame 10B provided with lugs 10C for supporting wheels 10D which slide in the slots of C-shaped guiding rails 10E which are arranged with a mirror-like configuration and both oriented perpendicularly to the sliding direction of the belt 10A.

The rails 10E are rigid with the machine fixed frame 1; with this frame 1 are also rigid the ends of the throughgoing rod of a hydraulic cylinder 10F which is affixed to the roller supporting frame 10B of the conveyor belt 10A. The oil supply to the hydraulic cylinder is controlled by known electric or mechanic valve systems, provided for carrying out the disclosed operating steps, in different easy ways in order to quickly provide very different layered configurations.

What is claimed is:

1. A system for stacking articles one layer at a time in desired patterns for loading, the system comprising:
    a single, continuously forward-moving conveyor belt for moving individually and successively a series of articles in a forward direction;
    a movable carriage on which the conveyor belt is mounted, the carriage being movable in a direction substantially perpendicular to the forward direction;
    a receiving roller assembly located downstream of the conveyor belt and adjacent thereto, the roller assembly being adapted to receive individually and successively each of the series of articles from the conveyor belt, the combination of the forward movement of the conveyor belt and the substantially perpendicular movement of the carriage delivering articles from the conveyor belt to the roller assembly such that each article is received on the roller assembly in a predetermined place and predetermined orientation so that a plurality of such articles delivered successively define the desired pattern on the roller assembly.

2. A system as claimed in claim 1 further comprising sensors for sensing the position of an article on the conveyor belt and control means responsive to signals from the sensors for controlling the movement of the conveyor belt and carriage respectively.

3. A system as claimed in claim 1 further comprising a prelocating belt on that side of the locating conveyor belt remote from the roller assembly having a low friction surface, and means for orienting an article moving along the prelocating belt in the desired orientation relative to said conveyor belt, said means for orienting an article comprising pallet arms journalled to hydraulic drive means, said pallet arms located slightly above said prelocating belt, wherein said pallet arms slide an article on the prelocating belt and thereby orient the article relative to said prelocating belt.

4. A system as claimed in claim 1 further comprising a first adjustable platform downstream of the roller assembly, the first platform being adapted to receive in the desired pattern a single layer of articles, and means for adjusting the height of the first platform after it has received such a layer of articles so that a further layer can be received in the same plane in order to create a stacked pallet.

5. A system as claimed in claim 4, further comprising a retractive stop abutment member located at the end of said roller assembly distant from and approximately perpendicular to the conveyor belt, wherein one side of the layer of articles forming the desired pattern abuts the stop abutment, thereby aiding in positioning the articles in the desired pattern on the roller assembly.

6. A system as claimed in claim 5, further comprising a second platform located above said first platform, said second platform having at least one trapdoor, and a preset stroke pallet which displaces the articles in the desired pattern from the roller assembly to the second platform such that when the trapdoor is withdrawn, the layer can fall precisely in place onto the first platform.

7. A system as claimed in claim 6, further comprising pallet arm means with two arms approximately perpendicular to the stop abutment, said pallet arms moveable to hold the formed layer of articles stationary on the second platform, whereby when the trapdoor is withdrawn, and the pallet arms are retracted from the layer of articles, the formed layer can fall precisely in place onto the first platform.

8. A system as claimed in claim 1, wherein said receiving roller assembly comprises a plurality of rollers whose rotation is controllable so that once articles are deposited on the rollers, the rotation of the rollers may be stopped.

* * * * *